entries, and columns 14, 15 and 16 for figures. The columns 10, 11, 14, 15 and 16 are further identified by the letters *m, n, o, p* and *q*, respectively, printed at the bottoms of said columns. The supplemental sheets 6, as indicated by the ruling and headings thereon, are for daily cash paid out and checks drawn.

The purpose of terminating the supplemental sheets short of the bottoms of the main sheets 5 is to leave a space on the front of each main sheet 5 which is ruled to form short figure columns 17 to 21, inclusive, and which columns are aligned with and form extensions or continuations of the columns 10, 11, 14, 15, and 16, respectively. The columns 17 to 21, inclusive, are further identified as continuations of the columns by corresponding letters *m, n, o, p,* and *q* printed at the tops thereof. Between the columns 18 and 19 is a wide space 22 aligned with the space 13 for instructions or memorandums.

When one of the supplemental sheets 6 is full or the month's business complete, the columns 10, 11, 14, 15, and 16, are footed and the total of each column is carried to the respective extension columns 17, 18, 19, 20, and 21, and at the end of the month, the extension or short columns 17 to 21, inclusive, are footed and the total of each column placed at the foot thereof.

By carrying the total of each column 10, 11, 14, 15, and 16 to the respective extension columns 17 to 21, inclusive, the customary practice of carrying the total of each column to the respective column on the next page and adding the same in with the amounts entered thereon is eliminated, thus saving a large amount of time and work; and avoids making mistakes such as carrying forward the wrong amount, transposing figures, or entering the amount carried forward in the wrong column.

Each main sheet 5, at its front and to the right of the supplemental sheets 6, is ruled at 24 to form spaces and columns in which, as shown, are distributed the items of monthly expenses. Below this ruling, said main sheet is ruled at 25 and 26 to form spaces and columns, in the former of which, as shown, are entered items other than business expenses, and the latter of which spaces and columns are for recapitulation of balance of cash paid out.

What I claim is:—

1. A book of the kind described having a main sheet, and a secondary sheet overlying the main sheet and terminating short of the bottom and one side thereof, said secondary sheet having a vertical memorandum column appropriately designated and a vertical figure column appropriately designated, said main sheet having a vertical figure column appropriately designated that is aligned with the vertical figure column on the secondary sheet, said main sheet having at one side of the secondary sheet upper and lower distributing columns appropriately designated for items entered on the secondary sheet.

2. A book of the kind described having a main sheet, and a secondary sheet terminating short of the bottom and one side thereof and having vertical figure columns appropriately designated and a vertical memorandum column appropriately designated, said main sheet having vertical figure columns that are aligned with the vertical figure columns appropriately designated on the secondary sheet and form continuations thereof, said main sheet having at one side of the secondary sheet distributing columns appropriately designated for the items entered on the secondary sheet.

3. A book of the kind described having a main sheet, and a secondary sheet overlying the main sheet, terminating short of the bottom and one side thereof and having vertical figure columns and a vertical memorandum column, said vertical figure columns of the secondary sheet having identifying characters, said main sheet having vertical figure columns that are aligned with the figure columns on the secondary sheet and form continuations thereof, said main sheet having at one side of the secondary sheet distributing columns for the items entered on the secondary sheet and also having a column, the lines of which have the same identifying characters as the vertical figure columns on the secondary sheet.

In testimony whereof I affix my signature.

FRANK H. STERLING.